(12) United States Patent
Takeyama

(10) Patent No.: US 10,079,402 B2
(45) Date of Patent: Sep. 18, 2018

(54) FUEL CELL MODULE

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 189 days.

(21) Appl. No.: 14/883,191

(22) Filed: Oct. 14, 2015

(65) Prior Publication Data

US 2016/0141700 A1 May 19, 2016

(30) Foreign Application Priority Data

Nov. 13, 2014 (JP) .................................. 2014-230528

(51) Int. Cl.
*H01M 8/24* (2016.01)
*H01M 8/2475* (2016.01)
*H01M 8/248* (2016.01)

(52) U.S. Cl.
CPC ......... *H01M 8/2475* (2013.01); *H01M 8/248* (2013.01)

(58) Field of Classification Search
CPC ........................... H01M 8/2475; H01M 8/248
See application file for complete search history.

(56) References Cited

U.S. PATENT DOCUMENTS

| 6,160,474 | A | 12/2000 | Tsunetomi et al. |
| 2008/0138670 | A1 | 6/2008 | Johnston |
| 2009/0029232 | A1* | 1/2009 | Petty .................. H01M 8/2485 429/460 |
| 2009/0280388 | A1 | 11/2009 | Inagaki |
| 2014/0147769 | A1 | 5/2014 | Takeyama |

FOREIGN PATENT DOCUMENTS

| JP | 3317905 B2 | 8/2002 |
| JP | 2006-040752 A | 2/2006 |
| JP | 2007-35558 | 2/2007 |
| JP | 2009-252597 | 10/2009 |
| JP | 4569499 B2 | 10/2010 |
| JP | 2013-012325 A | 1/2013 |

* cited by examiner

*Primary Examiner* — Ula C Ruddock
*Assistant Examiner* — Frank A Chernow
(74) *Attorney, Agent, or Firm* — Finnegan, Henderson, Farabow, Garrett & Dunner, LLP

(57) ABSTRACT

A fuel cell module includes a fuel cell and a case housing the fuel cell. The fuel cell includes a cell stack and a pressure plate arranged at an outermost position of a stacking direction relative to the cell stack. The case includes a cover section that faces the pressure plate and covers the pressure plate while the fuel cell is housed in the case. The cover section includes a pin housing portion having a through hole and a pin placed in the through hole with which the pressure plate is pressed. The pin housing portion has a thick part thicker than a thin part that is at least a part of the cover section continuous with the pin housing portion. The thick part is formed in an inward direction of the case.

4 Claims, 8 Drawing Sheets

MODIFICATION

MODIFICATION

FUEL CELL MODULE

CROSS-REFERENCE TO RELATED APPLICATIONS

The present application claims the priority based on the Japanese Patent Application No. 2014-230528 filed on Nov. 13, 2014, the entirety of disclosure of which is hereby incorporated by reference into this application.

BACKGROUND

Field

This invention relates to a fuel cell module including a fuel cell and a case housing the fuel cell.

Related Art

Some fuel cell including a cell stack as a stack of multiple unit cells is housed in a box-like case and used therein. Application of a load to the cell stack in a stacking direction has been required in order to maintain each of the unit cells in a stacked state inside the case. This may be achieved by a fuel cell suggested for example in JP2013-12325A. In this fuel cell, a pressure plate having an end surface substantially the same in size as an end surface of the cell stack is arranged outside the cell stack in the stacking direction so as to face an inner surface of the case. A load is applied to the cell stack in the stacking direction with the pressure plate. In this fuel cell, the case is provided with an opening and a screw hole penetrating the case in a thickness direction that are formed in advance in the surface of the case facing the pressure plate. After the fuel cell is housed in the case, a given load is applied to the pressure plate with a pressure member inserted through the opening. Then, with the load acting on the pressure plate, a load adjusting screw is screwed in through the screw hole to contact the pressure plate, thereby maintaining a state where the given load acts on the cell stack.

In the aforementioned fuel cell, reactive force from the cell stack against the load is transmitted to the case through the load adjusting screw. This causes a problem of deformation of the case near the screw hole. Additionally, a distance between the pressure plate and the case may become nonuniform due to nonuniformity of the thickness of the unit cell occurring during manufacture and loosening of the screw during operation, for example. This can be controlled by making the load adjusting screw contact the pressure plate by adjusting a degree of screwing of the load adjusting screw. However, depending on the length of the screw hole (screw thread) provided to the case, the length of the load adjusting screw might become insufficient or the rear end of the load adjusting screw might protrude from the case. To avoid such risks, several types of load adjusting screws of different lengths should be prepared as load adjusting screws for maintenance of a fuel cell module, causing increase in operational cost of the fuel cell module. Suppressing increase in installation space for the entire fuel cell module including the case has also been required. As understood from the above, a technique to allow suppression of deformation of the case housing the fuel cell, suppression of increase in operational cost of the fuel cell module, and suppression of increase in size of the entire fuel cell module including the case is desired.

SUMMARY

This invention has been made to solve at least some of the aforementioned problems. This invention can be implemented in the following aspects.

(1) According to one aspect of this invention, a fuel cell module including a fuel cell and a case housing the fuel cell is provided. In this fuel cell module, the fuel cell may include: a cell stack including a plurality of stacked unit cells; and a pressure plate arranged at an outermost position of a stacking direction of the a plurality of stacked unit cells relative to the cell stack. The case may include a cover section that faces the pressure plate and covers the pressure plate while the fuel cell is housed in the case. The cover section may include a pin housing portion having a through hole and a pin placed in the through hole with which the pressure plate is pressed. The pin housing portion may have a thick part that is thicker than a thin part that is at least a part of the cover section continuous with the pin housing portion. The thick part may be formed in an inward direction of the case. According to the fuel cell module of this aspect, the through hole where the pin is placed is formed in the thick part formed in the inward direction of the case. This provides rigidity of the case in a place near the through hole higher than rigidity in a corresponding place of a small thickness. This can suppress deformation of the case to be caused by reactive force received from the cell stack through the pin. Further, the thickness of the pin housing portion in the inward direction of the case is larger than that of the thin part, so that the length of the through hole in the stacking direction can be increased. Thus, a large margin of adjustment is allowed in a direction where the pin is inserted. This can make it unlikely that the length of the pin will become insufficient or the rear end of the pin will protrude from the case during adjustment of pressing force. Thus, only a small number of types of pins are required for the adjustment, thereby suppressing increase in operational cost of the fuel cell module. Further, the pin housing portion has the thick part and is continuous with the thin part. Thus, space can be ensured between the cover section and the pressure plate closed at least on two sides by the pin housing portion (thick part) and the thin part. This can provide a larger empty region between the cover section and the pressure plate than an empty region to be provided in a structure where the pin housing portion (thick part) is formed outside the case. This empty region can be used for housing of a member relating to the fuel cell module, thereby suppressing increase in size of the entire fuel cell module including the case.

(2) In the fuel cell module of the aforementioned aspect, the pin housing portion may include a rib provided to the cover section so as to protrude in the inward direction of the case and extend in a direction that crosses the stacking direction. According to the fuel cell module of this aspect, the pin housing portion includes the rib extending in the direction that crosses the stacking direction. This can increase the rigidity of the case, more specifically, that of the cover section.

(3) In the fuel cell module of the aforementioned aspect, the through hole may be formed in a peripheral area of the cover section and the rib may have a thickness determined in the inward direction that becomes larger gradually in the direction where the rib extends toward the peripheral area. According to the fuel cell module of this aspect, a surface of the pin housing portion facing the pressure plate can be formed like a planar surface. This structure facilitates manufacture of the case, compared to a structure where this surface has a step. Additionally, on the occurrence of collision of a mobile object such as a fuel cell vehicle on which the fuel cell module including the case is installed with an object such as a different vehicle, for example, this structure can make damage on the pressure plate unlikely that is to be caused by an edge of this step.

(4) In the fuel cell module of the aforementioned aspect, the pin may be configured as a male screw and the through hole may have an inner circumferential surface provided with a screw thread to be threadedly engaged with the male screw. According to the fuel cell module of this aspect, the pin is configured as the male screw and the through hole has the inner circumferential surface provided with the screw thread to be threadedly engaged with the male screw. Thus, with the pin inserted in the through hole, reactive force from the cell stack can be transmitted to the case reliably.

This invention can be implemented in various aspects. For example, this invention can be implemented in aspects such as a case for a fuel cell, a fuel cell system including a fuel cell module, a method of manufacturing the fuel cell module, and a method of manufacturing the case for a fuel cell.

DESCRIPTION OF EMBODIMENTS

A. Embodiment

A-1. Structure of Entire Module

Figure 1:
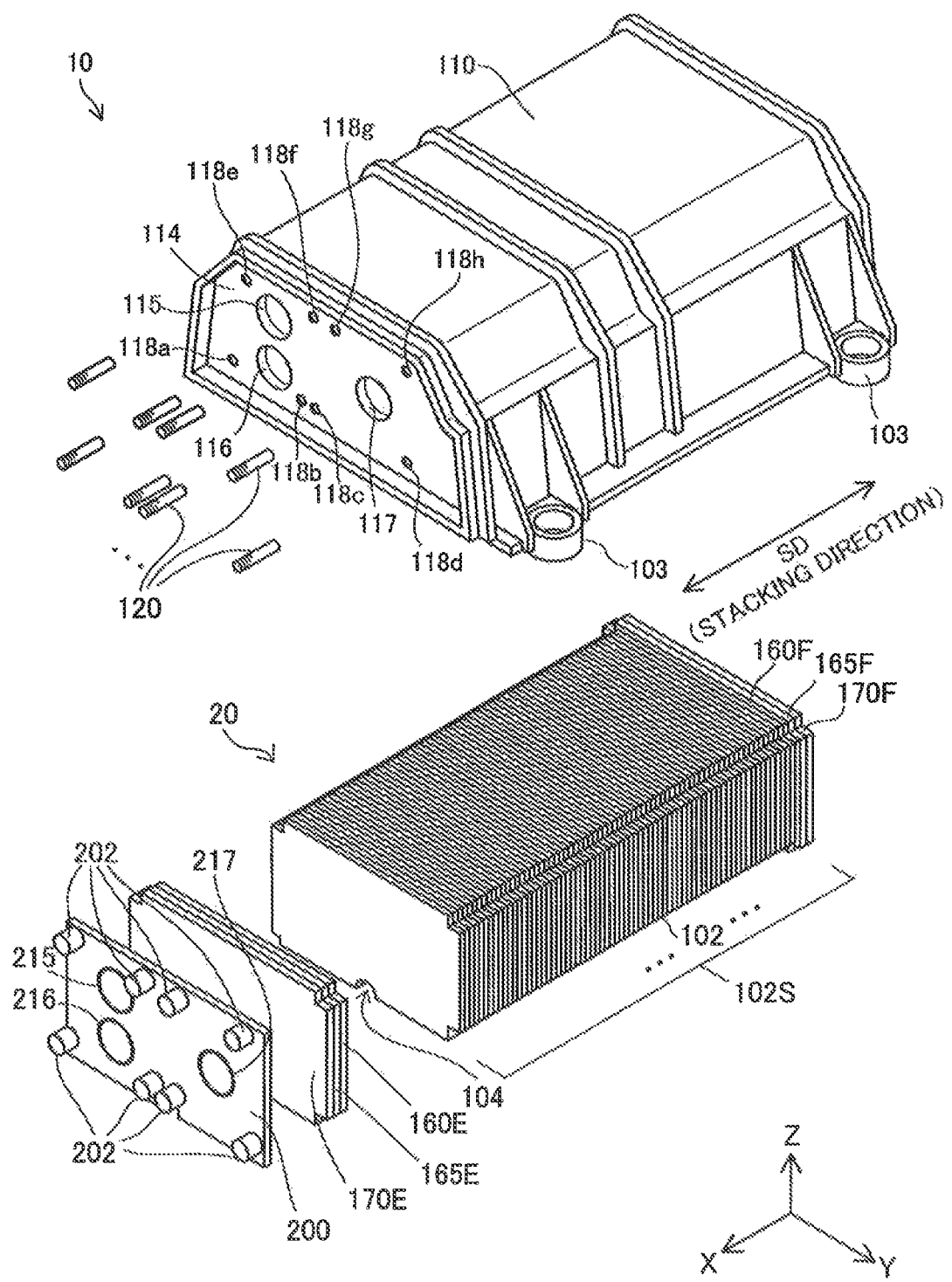
FIG. 1 is an exploded perspective view showing the outline of the structure of a fuel cell module as an embodiment of this invention.

FIG. 1 is an exploded perspective view showing the outline of the structure of a fuel cell module as an embodiment of this invention. FIG. 1 is an exploded view of a part of a fuel cell module 10 of this embodiment. In FIG. 1, an X-Y plane corresponds to a horizontal plane. Further, an X axis, a Y axis, and a Z axis are determined in a manner such that the Z axis extends parallel to a vertical direction. A +Z direction corresponds to an upward vertical direction. The fuel cell module 10 of this embodiment is installed on and used in a fuel cell vehicle as a driving power source. More specifically, when the fuel cell module 10 is to be used, the fuel cell module 10 is fixed with bolts to the underbody of a fuel cell vehicle through case legs 103 of the case 110. Instead of a fuel cell vehicle, the fuel cell module 10 may be installed on and used in any other mobile object requiring a power source. Still alternatively, the fuel cell module 10 may be a stationary power source for indoor use or outdoor use and installed in offices or houses, for example.

The fuel cell module 10 includes a fuel cell 20 and a case 110 housing the fuel cell 20. The fuel cell 20 is what is called a solid polymer fuel cell. The fuel cell 20 includes a cell stack 102S formed of a plurality of unit cells 102 stacked in a stacking direction SD shown in FIG. 1, a first terminal plate 160E, a first insulating plate 165E, a first end plate 170E, a second terminal plate 160F, a second insulating plate 165F, a second end plate 170F, and a pressure plate 200. The cell stack 102S and all of these plates have substantially rectangular planar shapes of substantially the same size as viewed in an X-axis direction, specifically, in a +X direction and a −X direction.

Each unit cell 102 generates power as a result of electrochemical reaction between hydrogen supplied as fuel gas to an anode-side catalyst electrode layer and oxygen in air supplied as oxidizing gas to a cathode-side catalyst electrode layer. The anode-side catalyst electrode layer and the cathode-side catalyst electrode layer are arranged in a manner such that a solid polymer electrolyte film is placed between the anode-side catalyst electrode layer and the cathode-side catalyst electrode layer. The catalyst electrode layer on each electrode side includes a catalyst such as carbon particles on which platinum (Pt) is supported and an electrolyte. Gas diffusion layers each formed of a porous body are arranged outside the catalyst electrode layers on both electrode sides. The porous body to be used may be a carbon porous body such as carbon paper or carbon cloth or a metal porous body such as metal mesh or foam metal, for example. A manifold not shown in the drawings for flow of the fuel gas, the oxidizing gas, and a cooling medium is formed inside the cell stack 102S so as to extend in the stacking direction SD.

The first terminal plate 160E, the first insulating plate 165E, and the first end plate 170E are aligned outwardly in this order in the stacking direction SD, more specifically, in the +X direction so as to be adjacent to each other. The second terminal plate 160F, the second insulating plate 165F, and the second end plate 170F are aligned outwardly in this order in the stacking direction SD, more specifically, in the −X direction so as to be adjacent to each other. The first terminal plate 160E is arranged so as to contact an end surface of the cell stack 102S in the +X direction. The second terminal plate 160F is arranged so as to contact an end surface of the cell stack 102S in the −X direction. The second terminal plate 160F, the second insulating plate 165F, and the second end plate 170F are each provided with a through hole that is prepared for connection to the aforementioned manifold inside the cell stack 102S and formed in a thickness direction, specifically, in a direction parallel to the X-axis direction.

Each of the first and second terminal plates 160E and 160F is a plate-like conductive member functioning as an overall electrode of the fuel cell 20. The first insulating plate 165E is a plate-like member that electrically insulates the first terminal plate 160E and the first end plate 170E. The second insulating plate 165F is a plate-like member that electrically insulates the second terminal plate 160F and the second end plate 170F. The first end plate 170E is a plate-like member having flat surfaces on opposite sides. The first end plate 170E functions as an end part of the manifold inside the cell stack 102S. The first end plate 170E has the function of transmitting pressing force received from the pressure plate 200 contacting the first end plate 170E from outside to the cell stack 102S through the first insulating plate 165E and the first terminal plate 160E. This pressing force is described in detail later. The second end plate 170F differs from the first end plate 170E in that the through hole for connection to the manifold inside the cell stack 102S is formed in the second end plate 170F. The structure and the function of the second end plate 170F are the same in every other respect as those of the first end plate 170E, so that they will not be described in detail.

The pressure plate 200 is a member shaped like a plate. The pressure plate 200 is arranged at an outermost position of the stacking direction SD relative to the cell stack 102S. One surface (surface in the −X direction) of the pressure plate 200 contacts an outer end surface of the first end plate 170E in the stacking direction SD and an opposite surface (surface in the +X direction) of the pressure plate 200 faces an inner surface of the case 110 (cover section 114 described later). In this embodiment, the pressure plate 200 is formed by aluminum die casting. The pressure plate 200 is provided with eight screw receiving portions 202 and three pressure receiving portions 215, 216, and 217 formed in the surface facing the inner surface of the case 110. All the eight screw receiving portions 202 are arranged near the outer periphery of the pressure plate 200. Each screw receiving portion 202 has a substantially columnar outer shape protruding toward the +X direction. Each screw receiving portion 202 contacts the tip of a load adjusting pin 120 described later. All the three pressure receiving portions 215 to 217 are arranged near the center in the plane of the pressure plate 200. Each of the pressure receiving portions 215 to 217 is raised slightly in the +X direction. Each of the pressure receiving portions 215 to 217 contacts the tip of a pressure member during assembly of the fuel cell module 10 to receive pressing force from the pressure member.

The case 110 has a box-like outer shape with an opening formed at a bottom surface section in the downward vertical direction. In this embodiment, the case 110 is made of a resin material. The case 110 may be made of metal materials such as aluminum and steel other than the resin material. The fuel cell 20 is housed into the case 110 through the opening at the bottom surface of the case 110 while the aforementioned components are kept stacked in the stacking direction SD. The case 110 has a cover section 114 at the end of the case 110 in the +X direction. The cover section 114 faces an end surface of the pressure plate 200 in the stacking direction SD to cover this end surface. The cover section 114 is provided with eight pin through holes 118a, 118b, 118c, 118d, 118e, 118f, 118g, and 118h, and three pressurizing through holes 115, 116, and 117. All these through holes in total of 11 penetrate the cover section 114 in a thickness direction, specifically, in a direction parallel to the X-axis direction. The cover section 114 is further provided with eight load adjusting pins 120 placed in the eight pin through holes 118a to 118h.

Each load adjusting pin 120 is inserted in a corresponding one of the pin through holes 118a to 118h so as to extend toward the pressure plate 200 in a direction parallel to the −X direction. The load adjusting pin 120 has a substantially columnar outer shape. In this embodiment, a screw thread is formed on the outer circumferential surface of the load adjusting pin 120. Specifically, each load adjusting pin 120 is configured as a male screw. A screw thread to be threadedly engaged with the screw thread of the load adjusting pin 120 is formed on the inner circumferential surface of each of the pin through holes 118a to 118h, more correctly, on the inner circumferential surface of the cover section 114 where each of the pin through holes 118a to 118h is formed. Thus, each load adjusting pin 120 is screwed into a corresponding one of the pin through holes 118a to 118h. The load adjusting pin 120 corresponds to a concept subordinate to a pin of claims.

During assembly of the fuel cell module 10, the aforementioned pressure member is inserted in each of the pressuring through holes 115 to 117. The pressuring through hole 115 and the pressure receiving portion 215 are arranged at positions facing each other in the X-axis direction. The pressuring through hole 116 and the pressure receiving portion 216 are arranged at positions facing each other in the X-axis direction. The pressuring through hole 117 and the pressure receiving portion 217 are arranged at positions facing each other in the X-axis direction.

The following describes a procedure of assembly of the fuel cell module 10 simply. First, as shown in FIG. 1, all the components of the fuel cell 20 are stacked in a direction parallel to the X-axis direction. These components in this stacked state are inserted into the case 110 through the opening at the bottom surface of the case 110. At this stage, the fuel cell module 10 is placed on a working table. Thus, the aforementioned step of inserting the components can be considered and restated as a step of covering the fuel cell 20 placed on the working table with the case 110. Next, rod-shaped pressure members not shown in the drawings are inserted through the three pressurizing through holes 115 to 117 to gradually apply pressing force, specifically, a load with these pressure members to the pressure plate 200 in the stacking direction SD, specifically, in the −X direction. When this pressing force reaches a certain level, each load adjusting pins 120 is inserted in a corresponding one of the pin through holes 118a to 118h while the pressing force is maintained. This pressing force is about 36.5 kN, for example. A torque applied for screwing in the load adjusting pin 120 is from about 1 to about 2.5 Nm, for example. When the tip of the load adjusting pin 120 contacts the screw receiving portion 202 of the pressure plate 200, screwing of the load adjusting pin 120 is finished. Next, a shaft member not shown in the drawings is placed so as to be housed in a groove 104 extending in the stacking direction SD formed in the center of the lower surface of the cell stack 102S. One end part of the shaft member is fixed to the cover section 114 and an opposite end part of the shaft member is fixed to a part of the case 110 facing the cover section 114. Next, the opening at the bottom surface of the case 110 is covered with a cover member not shown in the drawings.

The pressing force applied to the pressure plate 200 is transmitted to the cell stack 102S through the first end plate 170E, the first insulating plate 165E, and the first terminal plate 160E. The pressing force transmitted to the cell stack 102S is further transmitted to the second terminal plate 160F, the second insulating plate 165F, and the second end plate 170F in this order. An outer surface of the second end plate 170F in the stacking direction SD (−X direction) contacts the case 110. Thus, reactive force against the pressing force is transmitted to the cell stack 102S through the second end plate 170F, the second insulating plate 165F, and the second terminal plate 160F. The reactive force is further transmitted to the pressure plate 200 through the first terminal plate 160E, the first insulating plate 165E, and the first end plate 170E. The reactive force transmitted to the pressure plate 200 is further transmitted to each load adjusting pin 120 through the screw receiving portion 202 and then transmitted to the cover section 114 through the screw thread of each load adjusting pin 120 and the screw thread of each of the pin through holes 118a to 118h. In this embodiment, deformation of the cover section 114 to be caused by the reactive force transmitted to the cover section 114 is suppressed by a pin housing portion of the cover section 114 described later.

A2. Detailed Structure of Cover Section

Figure 2A:
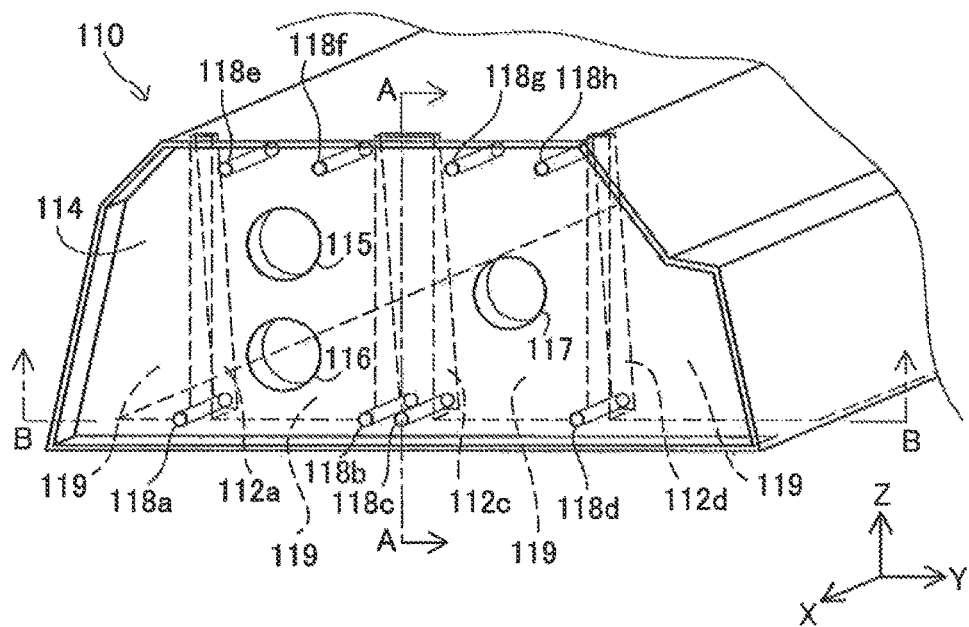
FIG. 2A is a perspective view showing the structure of an outer lateral surface of a cover section, specifically, a surface of the cover section in a +X direction in detail.
Figure 2B:
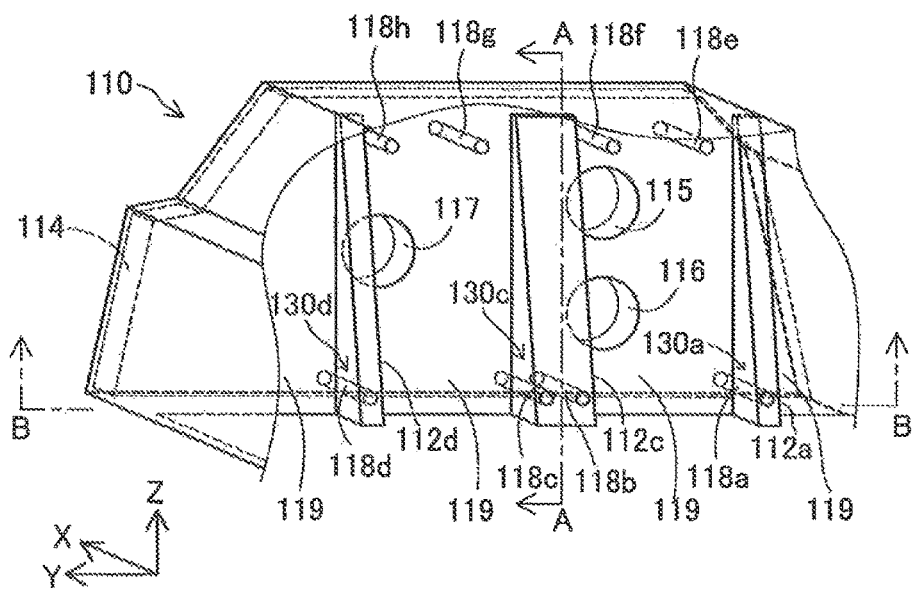
FIG. 2B is a perspective view showing the structure of an inner lateral surface of the cover section, specifically, a surface of the cover section in a −X direction in detail.
Figure 3A:
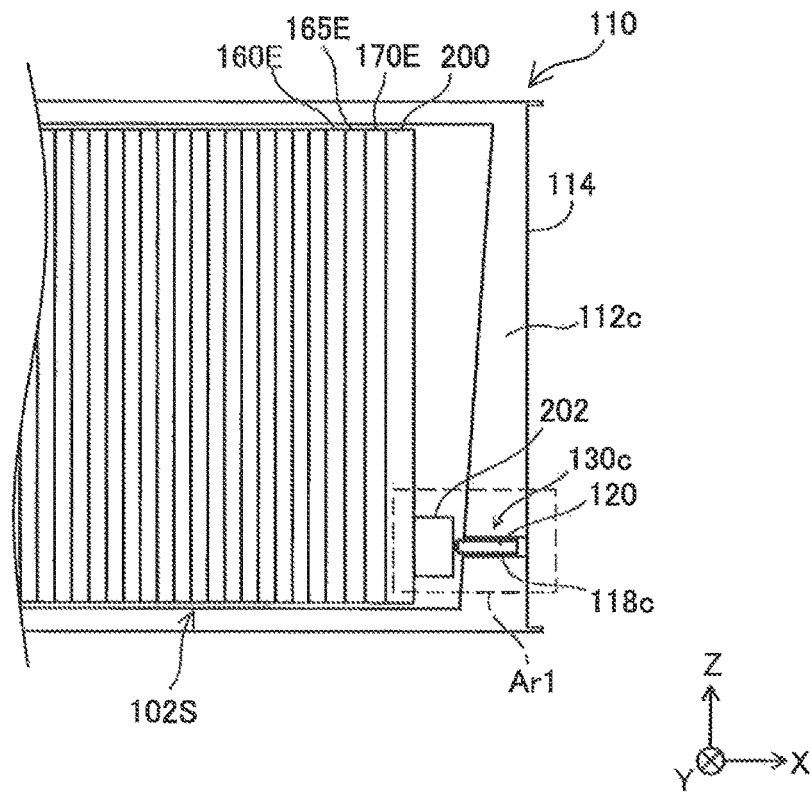
FIG. 3A is a sectional view showing a cross section taken along A-A of FIGS. 2A and 2B.
Figure 3B:
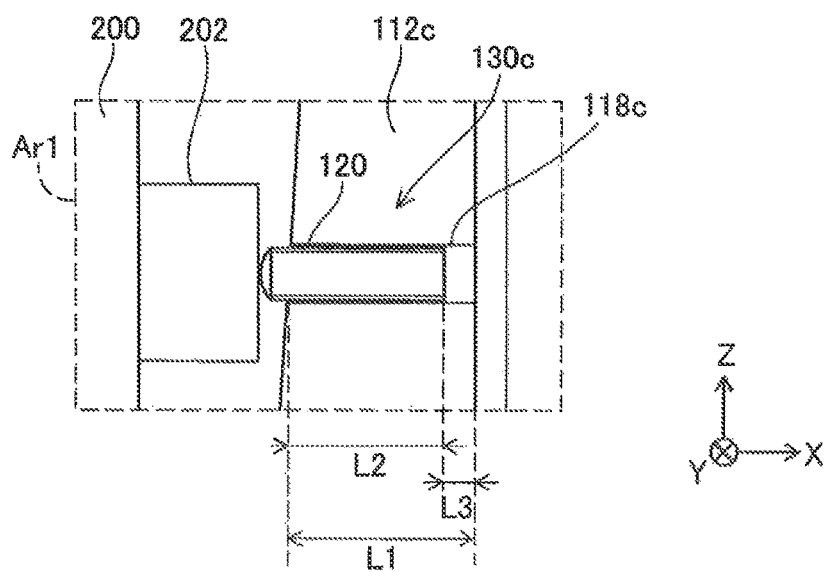
FIG. 3B is an enlarged sectional view showing a region Ar1 in an enlarged manner indicated by dashes in FIG. 3A.
Figure 4:
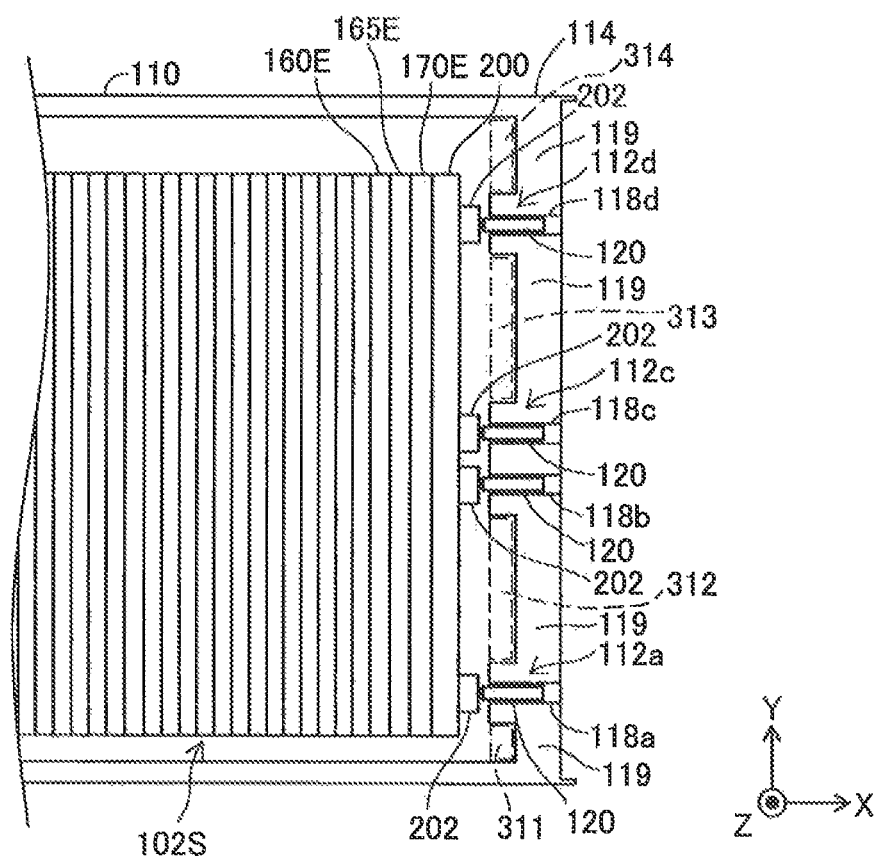
FIG. 4 is a sectional view showing a cross section taken along B-B of FIGS. 2A and 2B.

FIG. 2A is a perspective view showing the structure of an outer lateral surface of the cover section 114, specifically, a surface of the cover section 114 in the +X direction in detail. FIG. 2B is a perspective view showing the structure of an inner lateral surface of the cover section 114, specifically, a surface of the cover section 114 in the −X direction in detail. In FIG. 2A, the structure of a part of the cover section 114 in the −X direction is indicated by dash lines. For the convenience of illustration, ribs shown in FIG. 1 protruding outwardly along the Y-Z plane from a surface of the case 110 are omitted from FIGS. 2A and 2B. FIG. 3A is a sectional view showing a cross section taken along A-A of FIGS. 2A and 2B. FIG. 3B is an enlarged sectional view showing a region Ar1 in an enlarged manner indicated by dashes in FIG. 3A. FIG. 4 is a sectional view showing a cross section taken along B-B of FIGS. 2A and 2B. In FIGS. 2A, 2B, 3A, 3B, and 4, the screw thread formed on the outer circumferential surface of each load adjusting pin 120 and the screw thread formed on the inner circumferential surface of each of the pin through holes 118a to 118h are not shown.

As shown in FIGS. 2A and 2B, the cover section 114 is provided with three pin housing portions 112a, 112c, and 112d. Each of the pin housing portions 112a, 112c, and 112d has an outer shape like a rib formed on a surface of the cover section 114 facing the pressure plate 200 so as to protrude in an inward direction of the case 110, specifically, in the −X direction and extend parallel to a Z-axis direction. The pin through hole 118a is formed in the pin housing portion 112a near an end part of the pin housing portion 112a in a −Z direction. Likewise, the two pin through holes 118b and 118c are formed in the pin housing portion 112c near an end part of the pin housing portion 112c in the −Z direction and the pin through hole 118d is formed in the pin housing portion 112d near an end part of the pin housing portion 112d in the −Z direction. These three pin housing portions 112a, 112c, and 112d have similar structures. Thus, the structure of the pin housing portion 112c is described as a representative.

As shown in FIG. 3A, the thickness, specifically, the length in the X-axis direction of the pin housing portion 112c is minimum at an end part thereof in the +Z direction and becomes larger gradually toward the −Z direction. The pin through hole 118c is arranged near a peripheral area of the pin housing portion 112c in the −Z direction. Thus, the pin housing portion 112c is thick in a place near the pin through hole 118c, as shown in FIG. 3A. In this way, rigidity in the place near the pin through hole 118c becomes higher than rigidity in a corresponding place of a thickness smaller than that of this embodiment. This suppresses deformation of the case 110 to be caused by reactive force transmitted to the case 110 from the cell stack 102S through the load adjusting pin 120. As shown in FIG. 3B, a thickness L1 near the pin through hole 118c is greater than a length L2 of the load adjusting pin 120 inserted in the pin through hole 118c. In this structure, a base end part of the load adjusting pin 120 does not protrude from the pin through hole 118c in the +X direction. Further, even if the position of the load adjusting pin 120 is adjusted toward the +X direction by a length L3 resulting from a difference between the thickness L1 and the length L2, protrusion of the base end part of the load adjusting pin 120 from the pin thorough hole 118c toward the +X direction can still be prevented. In other words, with the load adjusting pin 120 inserted in the pin through hole 118c and contacting the screw receiving portion 202, a margin of adjustment corresponding to the length L3 exists in the +X direction in the pin through hole 118c. Thus, even if the length of the cell stack 102S in the stacking direction SD differs between manufacturing lots due to nonuniformity of the thickness of the unit cell 102 occurring during manufacture to make a distance between the case 110 and the pressure plate 200 differ between the manufacturing lots, the load adjusting pin 120 can still be placed at a proper position and protrusion of the base end part of the load adjusting pin 120 toward the +X direction from the pin through hole 118c can still suppressed by adjusting a degree of screwing of the load adjusting pin 120. Likewise, even if a distance between the case 110 and the pressure plate 200 is changed during operation of the fuel cell module 10, the load adjusting pin 120 can still be moved to a proper position and protrusion of the base end part of the load adjusting pin 120 toward the +X direction from the pin through hole 118c can still be suppressed by adjusting a degree of screwing of the load adjusting pin 120. A comparatively large margin of adjustment is allowed. Thus, only a small number of types of load adjusting pins 120, for example, only one type of load adjusting pin 120 is required for the adjustment. As represented by the aforementioned part of the pin housing portion 112c near the pin through hole 118c, respective parts of the pin housing portions 112a, 112c, and 112d near the pin through holes 118a to 118d are configured as a thick part 130a, a thick part 130c, and a thick part 130d. The thick parts 130a, 130c, and 130d are thicker than respective parts of the pin housing portions 112a, 112c, and 112d away from the pin through holes 118a to 118d. The thick parts 130a, 130c, and 130d are thicker than a thin part 119 described later.

For the convenience of illustration, only the three pin housing portions 112a, 112c, and 112d are shown in FIGS. 2A and 2B. The cover section 114 is further provided with four pin housing portions prepared for the four pin through holes 118e, 118f, 118g, and 118h. These four pin housing portions have a structure formed by turning the pin housing portions 112a and 112d upside down.

As shown in FIGS. 2A and 2B, the thin part 119 is formed between the pin housing portions 112a and 112c, between the pin housing portions 112c and 112d, between an end part of the cover section 114 in a −Y direction and the pin housing portion 112a, and between an end part of the cover section 114 in a +Y direction and the pin housing portion 112d. In other words, the cover section 114 includes the thin part 119 extending continuously in a Y-axis direction, specifically, in the +Y direction and the −Y direction from each of the pin housing portions 112a, 112c, and 112d. The thin part 119 has a plate-like outer shape of a constant thickness in the X-axis direction. The thickness of the thin part 119 in the X-axis direction is smaller, specifically, the thin part 119 is thinner in the X-axis direction than each of the pin housing portions 112a, 112c, and 112d in the X-axis direction, more specifically, thinner than each of the pin housing portions 112a, 112c, and 112d at any position in the Z-axis direction. This difference in thickness in the X-axis direction between the thin part 119 and each of the pin housing portions 112a, 112c, and 112d forms four regions 311, 312, 313, and 314 extending in the Z-axis direction between the case 110 and the pressure plate 200, as shown in FIG. 4. The region 311 is closed on three sides by an inner surface of the case 110 in the −Y direction, the thin part 119, and the pin housing portion 112a. Likewise, the region 312 is closed on three sides by the pin housing portion 112a, the thin part 119, and the pin housing portion 112c. The region 313 is closed on three sides by the pin housing portion 112c, the thin part 119, and the pin housing portion 112d. Further, the region 314 is closed on three sides by the pin housing portion 112d, the thin part 119, and an inner surface of the case 110 in the +Y direction. As a result of the presence of these regions, a comparatively large empty region is formed between the case 110 and the pressure plate 200. This empty region can be used for example for housing of a wire harness, thereby suppressing increase in installation space for the entire fuel cell module 10 including the case 110.

A3. Comparative Example

Figure 5:
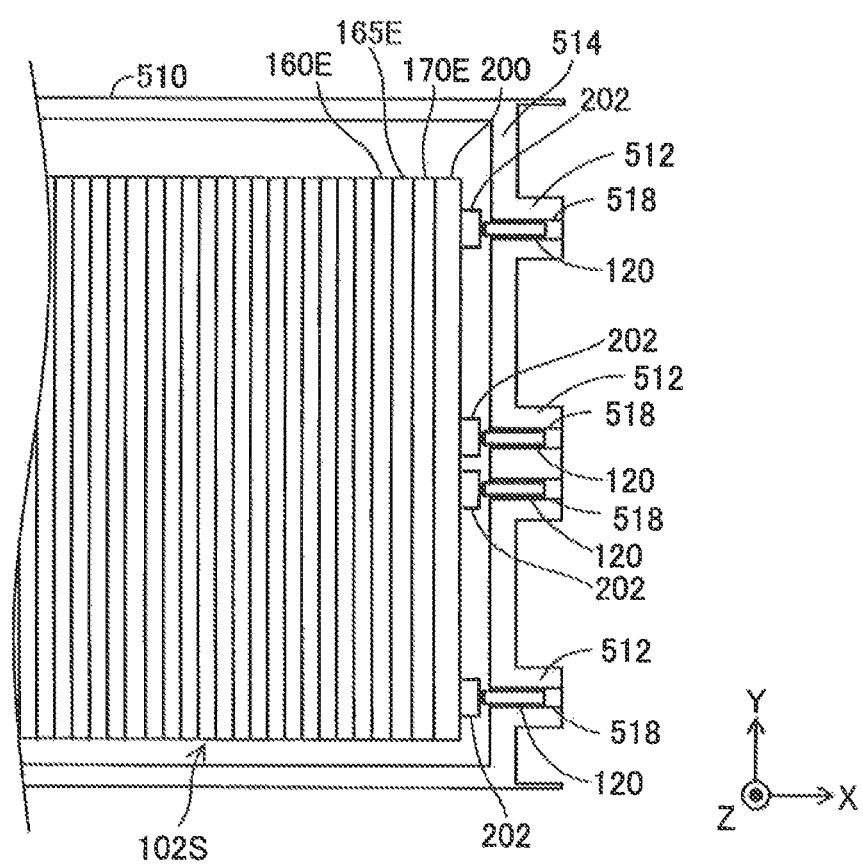
FIG. 5 is a sectional view showing the structure of a cover section of Comparative Example in detail.

FIG. 5 is a sectional view showing the structure of a cover section 514 of Comparative Example in detail. The cover section 514 of a case 510 of Comparative Example includes three pin housing portions 512. Each pin housing portion 512 has an outer shape like a rib formed on an outer surface of the cover section 514 so as to protrude outwardly (+X direction) of the case 110 and extend parallel to the Z-axis direction. A pin through hole 518 is formed in the pin housing portion 512 near an end part of the pin housing portion 512 in the −Z direction. The case 510 of Comparative Example has an outline (the volume of a part surrounded by an outer surface) of the same size as that of the case 110 of the aforementioned embodiment. The fuel cell 20 housed in the case 510 is the same as the fuel cell 20 of the aforementioned embodiment.

In the case 510 of Comparative Example having the aforementioned structure, an empty region between the case 510, more specifically, between the cover section 514 and the pressure plate 200 is comparatively narrow. Thus, this region cannot be used effectively, leading to increase in installation space for an entire fuel cell module including the case 510 and the fuel cell 20. By contrast, in the fuel cell module 10 of the aforementioned embodiment, a comparatively large empty region can be formed between the case 110, more specifically, between the cover section 114 and the pressure plate 200. This empty region can be used for reduction in size of the entire fuel cell module 10.

In the fuel cell module 10 of the aforementioned embodiment, the through holes 118a to 118d in which the load adjusting pins 120 are inserted are formed in the pin housing portions 112a, 112c, and 112d protruding in the inward direction of the case 110. This provides higher rigidity in a place near each of the through holes 118a to 118d than rigidity in a corresponding place of a smaller thickness. Thus, even if reactive force is received at the case 110 from the cell stack 102S through the load adjusting pin 120, deformation of the case 110 to be caused by this reactive force can be suppressed. Further, the thickness of each of the pin housing portions 112a, 112c, and 112d in the inward direction of the case 110, specifically, in a direction where the load adjusting pin 120 is inserted, is larger than the thickness of the thin part 119. This can increase the length of the pin through hole 118c in the insertion direction. Thus, a large margin of adjustment is allowed in the insertion direction of the load adjusting pin 120. This can make it unlikely that the length of a load adjusting screw will become insufficient or the rear end of the load adjusting screw will protrude from a case. Additionally, if a distance between the case 110 and the pressure plate 200 becomes nonuniform and if this distance is changed, it is likely that such nonuniformity and such change can be handled by adjusting screwing of the load adjusting pin 120. Thus, only a small number of types of load adjusting pins 120, for example, only one type of load adjusting pin 120 is required for the adjustment. This eliminates the need for preparing several types of load adjusting screws of different lengths, thereby suppressing increase in operational cost of the fuel cell module 10.

Each of the pin housing portions 112a, 112c, and 112d is formed so as to protrude toward the inside of the case 110. This allows formation of the regions 311 and 314 between the cover section 114 and the pressure plate 200 each closed on three sides by the inner surface of the case 110, the thin part 119, and the pin housing portion and formation of the regions 312 and 313 between the cover section 114 and the pressure plate 200 each closed on three sides by the thin part 119 and two pin housing portions. Thus, a comparatively large empty region can be formed between the cover section 114 and the pressure plate 200. This empty region can be used for housing of a member relating to the fuel cell module 10 such as a wire harness, thereby suppressing increase in installation space for the entire fuel cell module 10 including the case 110.

Each of the pin housing portions 112a, 112c, and 112d has an outer shape like a rib protruding in the inward direction of the case 110 and extending parallel to the Z-axis direction. Thus, the case 110, more specifically, the cover section 114 can be given enhanced rigidity.

The thickness of each of the pin housing portions 112a, 112c, and 112d is minimum at the end part thereof in the +Z direction and becomes larger gradually toward the −Z direction. Thus, a surface of each of the pin housing portions 112a, 112c, and 112d facing the pressure plate 200 can be formed like a planar surface. This structure facilitates manufacture of the case 110, compared to a structure where this surface has a step. Additionally, on the occurrence of collision of a fuel cell vehicle with any object, for example, this structure can make damage on the pressure plate 200 unlikely that is to be caused by contact of an edge of this step with the pressure plate 200.

The load adjusting pin 120 is configured as a male screw and the screw thread to be threadedly engaged with the male screw is formed on the inner circumferential surface of the through hole. Thus, with the load adjusting pin 120 inserted in a corresponding one of the pin through holes 118a to 118h, reactive force from the cell stack 102S can be transmitted to the case 110 reliably.

B. Modifications

B1. First Modification

In the aforementioned embodiment, the thickness of the pin housing portion 112c (the length in the X-axis direction) is minimum at the end part thereof in the +Z direction and becomes larger gradually toward the −Z direction, to which this invention is not limited.

Figure 6:
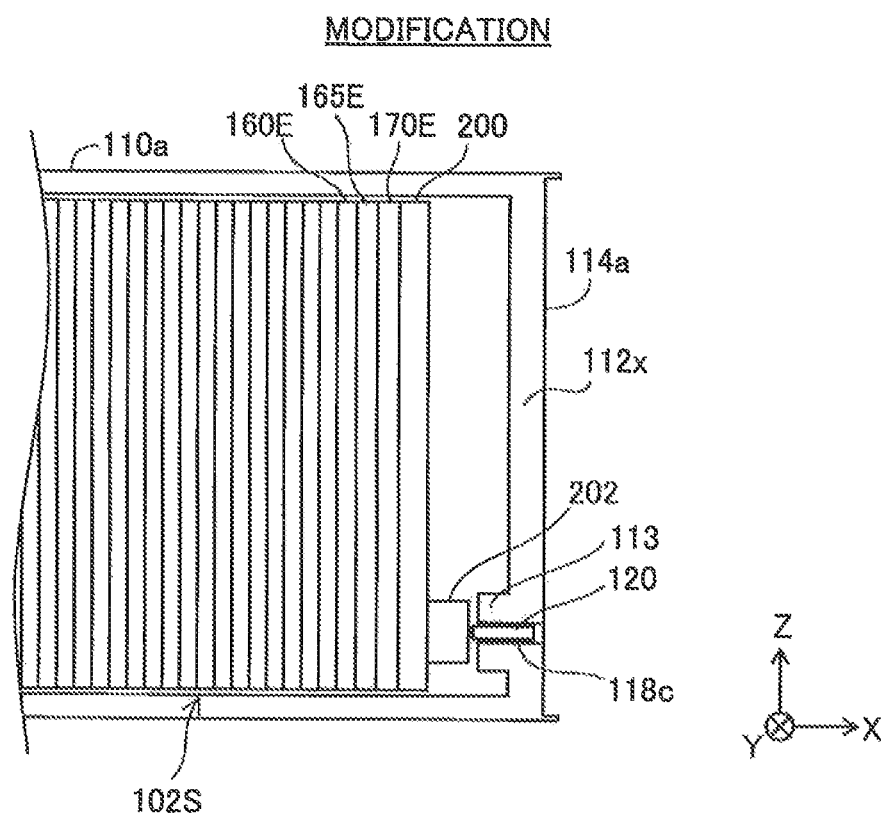
FIG. 6 is a sectional view showing the structure of a cover section of a first aspect of a modification.

FIG. 6 is a sectional view showing the structure of a cover section of a first aspect of a modification. A fuel cell module of the first aspect of the modification differs from the fuel cell module 10 of the aforementioned embodiment in that it includes a case 110a instead of the case 110. The fuel cell module of the first aspect of the modification is the same in every other respect as the fuel cell module 10. Corresponding components are identified by the same signs and will not be described in detail. In the fuel cell module of the first aspect of the modification, the case 110a differs from the case 110 of the aforementioned embodiment in that it includes a cover section 114a instead of the cover section 114 while being the same as the case 110 in every other respect.

The cover section 114a differs from the cover section 114 of the aforementioned embodiment in that it includes a pin housing portion 112x instead of the pin housing portion 112c. The pin housing portion 112x includes a protrusion 113 that is thicker, specifically, longer in the X-axis direction than other parts of the pin housing portion 112x. The protrusion 113 is provided with the pin through hole 118c. A part of the pin housing portion 112x closer to the +Z direction than the protrusion 113 and a part of the pin housing portion 112x closer to the −Z direction than the protrusion 113 are both thinner than the protrusion 113. Further, the thickness of the part of the pin housing portion 112x closer to the +Z direction than the protrusion 113 and that of the part of the pin housing portion 112x closer to the −Z direction than the protrusion 113 are constant at any position in the Z-axis direction. Even this structure still makes the pin housing portion 112x thicker than the thin part 119 adjacent to the pin housing portion 112x in the Y-axis direction. Thus, the fuel cell module of the first aspect of the modification achieves effect comparable to that achieved by the fuel cell module 10 of the aforementioned embodiment. Additionally, the volume of the pin housing portion 112x can be reduced to achieve reduction in weight of the case 110a. In this first aspect, the protrusion 113 corresponds to a concept subordinate to a thick part of claims.

Figure 7:
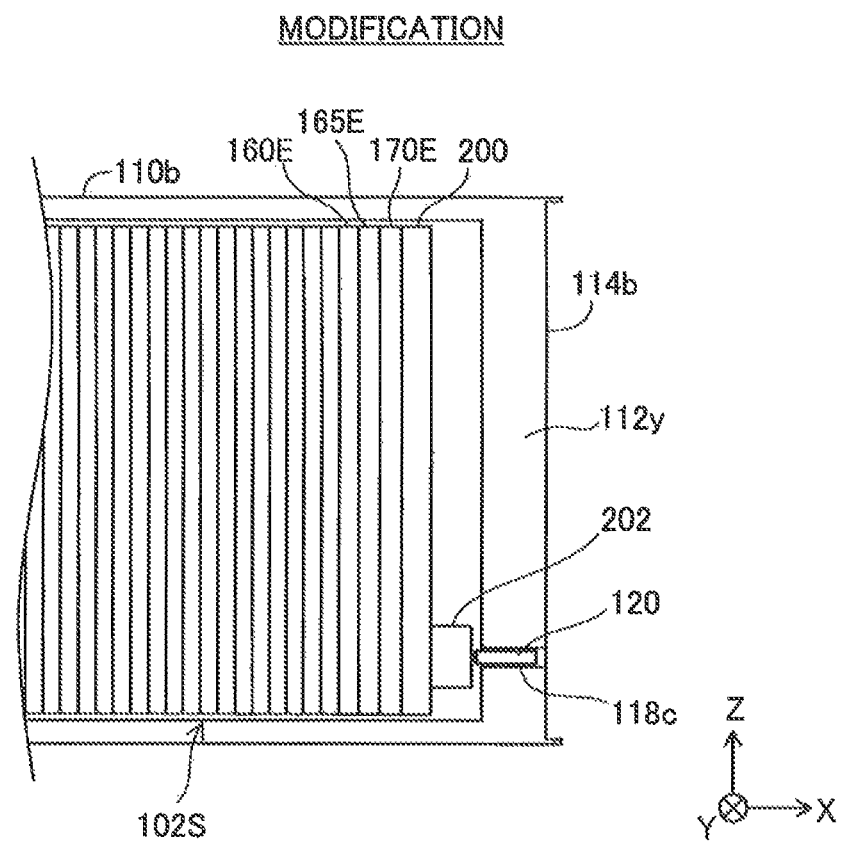
FIG. 7 is a sectional view showing the structure of a cover section of a second aspect of the modification.

FIG. 7 is a sectional view showing the structure of a cover section of a second aspect of the modification. A fuel cell module of the second aspect of the modification differs from the fuel cell module 10 of the aforementioned embodiment in that it includes a case 110b instead of the case 110. The fuel cell module of the second aspect of the modification is the same in every other respect as the fuel cell module 10. Corresponding components are identified by the same signs and will not be described in detail. The case 110b differs from the case 110 of the aforementioned embodiment in that it includes a cover section 114b instead of the cover section 114 while being the same as the case 110 in every other respect.

The cover section 114b differs from the cover section 114 of the aforementioned embodiment in that it includes a pin housing portion 112y instead of the pin housing portion 112c. The thickness of the pin housing portion 112y is constant at any position in the Z-axis direction. The thickness of the pin housing portion 112y is substantially the same as the thickness of a part of the cover section 114 of the embodiment where the pin through hole 118c is formed. Even this structure still makes the pin housing portion 112y thicker than the thin part 119 adjacent to the pin housing portion 112y in the Y-axis direction. Thus, the fuel cell module of the second aspect of the modification achieves effect comparable to that achieved by the fuel cell module 10 of the aforementioned embodiment. In this second aspect of the modification, the pin housing portion 112y corresponds to a concept subordinate to a pin housing portion and the thick part of claims.

B2. Second Modification

In the aforementioned embodiment, the thin part 119 is arranged so as to be adjacent to, in other words, continuous with each of the pin housing portions 112a, 112c, and 112d in the Y-axis direction, to which this invention is not limited.

Figure 8:
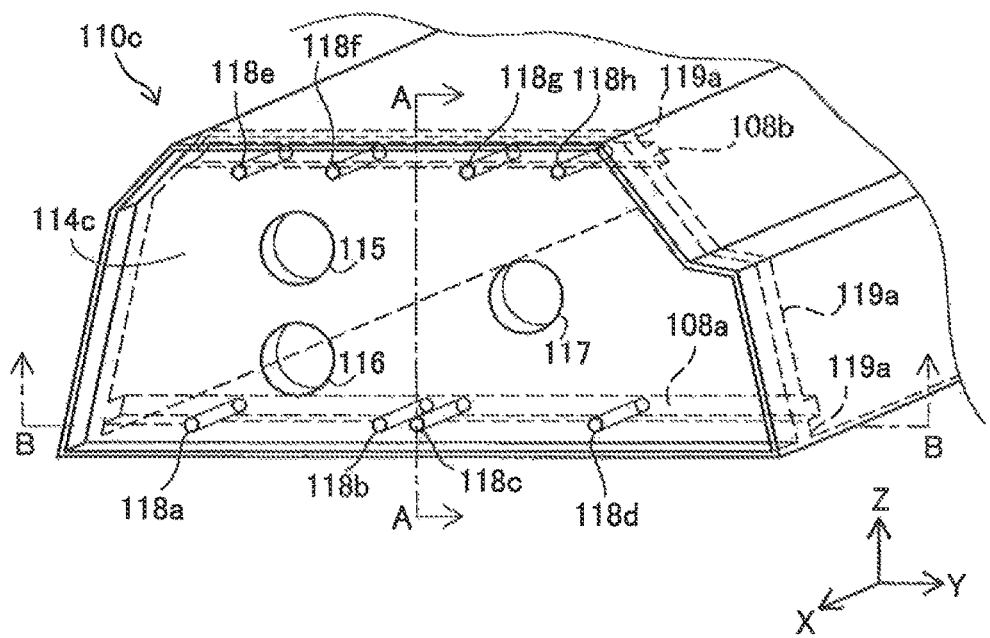
FIG. 8 is a perspective view showing the structure of a cover section of a third aspect of the modification.
Figure 9:
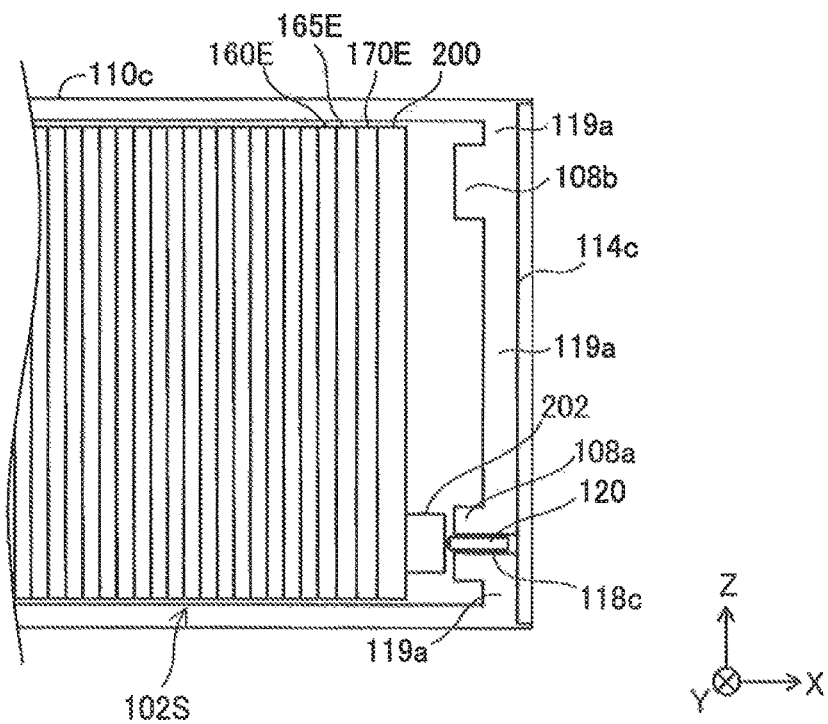
FIG. 9 is a sectional view showing the structure of the cover section of the third aspect of the modification.

FIG. 8 is a perspective view showing the structure of a cover section of a third aspect of the modification. FIG. 9 is a sectional view showing the structure of the cover section according to the third aspect of the modification. Like in FIG. 2, the structure of a part of a cover section 114c in the −X direction of the third aspect of the modification is indicated by dash lines in FIG. 8. As shown in FIG. 8, the cover section 114c of the third aspect of the modification differs from the cover section 114 of the aforementioned embodiment in that it includes two pin housing portions 108a and 108b instead of multiple pin housing portions including the pin housing portions 112a, 112c, and 112d. The cover section 114c of the third aspect of the modification is the same in every other respect as the cover section 114. Corresponding components are identified by the same signs and will not be described in detail.

The pin housing portion 108a has an outer shape like a rib formed on a surface of the cover section 114c facing the pressure plate 200 so as to protrude in an inward direction of a case 110c, specifically, in the −X direction and extend parallel to the Y-axis direction. The thickness of the pin housing portion 108a, specifically, the length thereof in the X-axis direction is constant at any position in the Y-axis direction. The pin housing portion 108a is arranged in an outer peripheral area of the cover section 114c in the −Z direction. The four pin through holes 118a, 118b, 118c, and 118d are formed in the pin housing portion 108a. The pin housing portion 108b is arranged in an outer peripheral area of the cover section 114c in the +Z direction. The four pin through holes 118e, 118f, 118g, and 118h are formed in the pin housing portion 108b.

As shown in FIGS. 8 and 9, a thin part 119a is formed so as to be adjacent to, in other words, continuous with the pin housing portion 108a on the side of each of the −Z direction and the +Z direction. The thin part 119a is also formed so as to be adjacent to, in other words, continuous with the pin housing portion 108b on the side of each of the −Z direction and the +Z direction. Like the thin part 119 of the aforementioned embodiment, the thin part 119a has a plate-like outer shape of a constant thickness in the X-axis direction. The thickness of the thin part 119a in the X-axis direction is smaller, specifically, the thin part 119a is thinner in the X-axis direction than each of the pin housing portions 108a and 108b in the X-axis direction, more specifically, thinner than each of the pin housing portions 108a and 108b at any position in the Y-axis direction. Even this structure still makes the pin housing portion 108a and 108b thicker than the thin part 119a adjacent to the pin housing portions 108a and 108b in the Z-axis direction. Thus, a fuel cell module of the third aspect of the modification achieves effect comparable to that achieved by the fuel cell module 10 of the aforementioned embodiment.

In the aforementioned third aspect of the modification, the thin part 119a existing below the pin housing portion 108a, specifically, existing on the side of the −Z direction relative to the pin housing portion 108a may be omitted. Specifically, the pin housing portion 108a may extend as far as to the bottom of the case 110c. In this structure, the pin housing portion 108a is continuous with the thin part. 119a only on the side of the +Z direction.

In the aforementioned third aspect of the modification, the pin housing portion 108a has a thickness constant at any position in the Y-axis direction. Alternatively, the pin housing portion 108a may protrude in the −X direction only near a place where each of the pin through holes 118a, 118b. 118c, and 118d is formed and may have a thickness same as that of the thin part 119a in every other place. Specifically, a pin housing portion may be formed like a square pole having a height extending in the X-axis direction from each of the pin through holes 118a, 118b, 118c, and 118d. In this structure, each pin housing portion becomes continuous with the thin part 119a in the Y-axis direction and continuous with the thin part 119a in the Z-axis direction. As understood from the aforementioned embodiment and the aforementioned modification, a pin housing portion having a thick part thicker than a thin part that is at least a part of a cover section continuous with the pin housing portion may be applied in a fuel cell module of this invention.

B3. Third Modification

In the aforementioned embodiment, each of the pin housing portions 112a, 112c, and 112d extends in the Z-axis direction. In the third aspect of the modification, each of the pin housing portions 108a and 108b extends in the Y-axis direction. In a structure where each pin housing portion has an outer shape like a rib, however, a direction where each pin housing portion extends is not limited to the Z-axis direction or the Y-axis direction but each pin housing portion may extend in any direction that crosses the stacking direction SD.

B4. Fourth Modification

In the aforementioned embodiment, the load adjusting pin 120 is configured as a male screw and is threadedly engaged with the screw thread formed on the inner circumferential surface of each of the pin through holes 118a to 118h, to which this invention is not limited. The screw thread may be omitted from the outer circumferential surface of the load adjusting pin 120 and the screw thread may be omitted from the inner circumferential surface of each of the pin through holes 118a to 118h. In this structure, the load adjusting pin 120 may be pressed into a corresponding one of the pin through holes 118a to 118h under a given load and the position of the load adjusting pin 120 may be fixed with frictional force acting between the outer circumferential surface of the load adjusting pin 120 and the inner circumferential surface of a corresponding pin through hole. Specifically, any pin placed in a corresponding one of the pin through holes 118a to 118h with which the pressure plate 200 is pressed is generally applicable in the fuel cell module of this invention.

B5. Fifth Modification

The structure of the fuel cell module of the aforementioned embodiment is given only as an example and can be changed in various ways. The thin part 119 of the cover section 114 of the embodiment may be provided with a rib without a pin through hole extending in the Z-axis direction parallel to the pin housing portions 112a, 112c, and 112d. Even in this structure, the thin part 119 still exists at least in a part continuous with each of the pin housing portions 112a, 112c, and 112d in the Y-axis direction, thereby achieving effect comparable to that achieved by the aforementioned embodiment. The three pressure receiving portions 215, 216, and 217 may be omitted from the pressure plate 200. The screw receiving portions 202 may be omitted from the pressure plate 200. The number of pressure receiving portions provided to the pressure plate 200 may be determined arbitrarily. Likewise, the number of screw receiving portions provided to the pressure plate 200 may be determined arbitrarily. Further, the number of the load adjusting pins 120 and that of pin through holes may be determined arbitrarily. A relationship of the posture of the fuel cell module 10 when it is installed with the horizontal plane and the vertical direction is not limited to that described in the aforementioned embodiment. Further, each unit cell 102 is described as a unit cell for a solid polymer fuel cell. Alternatively, each unit cell 102 may be configured as a unit cell for various fuel cells such as a phosphoric-acid fuel cell, a molten carbonate fuel cell, and a solid oxide fuel cell.

The invention is not limited to any of the embodiment and its modifications described above but may be implemented by a diversity of configurations without departing from the scope of the invention. For example, the technical features of any of the embodiment and its modifications corresponding to the technical features of the respective aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A fuel cell module comprising:
a fuel cell and
a case housing the fuel cell, wherein
the fuel cell includes a cell stack including a plurality of stacked unit cells and a pressure plate arranged at an outermost position of a stacking direction of the plurality of stacked unit cells relative to the cell stack,
the case includes a cover section that faces the pressure plate in the stacking direction and covers the pressure plate while the fuel cell is housed in the case,
the cover section includes a pin housing portion including a through hole in the stacking direction and a pin placed in the through hole with which the pressure plate is pressed in the stacking direction,
the pin housing portion has a thick part that is thicker than a thin part that is at least a part of the cover section continuous with the pin housing portion, and
the thick part is formed in an inward direction of the case.

2. The fuel cell module according to claim 1, wherein the pin housing portion includes a rib provided to the cover section so as to protrude in the inward direction of the case and extend in a direction that crosses the stacking direction.

3. The fuel cell module according to claim 2, wherein the through hole is formed in a peripheral area of the cover section, and
the rib has a thickness determined in the inward direction that becomes larger gradually in the direction where the rib extends toward the peripheral area.

4. The fuel cell module according to claim 1, wherein the pin is configured as a male screw, and
the through hole has an inner circumferential surface provided with a screw thread to be threadedly engaged with the male screw.

* * * * *